United States Patent
Ruedisueli et al.

(10) Patent No.: US 6,199,448 B1
(45) Date of Patent: Mar. 13, 2001

(54) STEERING ATTACHMENT WITH TAPERED PIN AND FASTENER

(75) Inventors: Kevin Ruedisueli, Lake Orion; Al A. Saberan, New Baltimore; Jeffery A. Harvey, Sterling Heights, all of MI (US)

(73) Assignees: TRW Inc.; TRW Vehicle Safety Systems Inc., both of Lyndhurst, OH (US)

( * ) Notice: Subject to any disclaimer, the term of this patent is extended or adjusted under 35 U.S.C. 154(b) by 0 days.

(21) Appl. No.: 09/436,965

(22) Filed: Nov. 9, 1999

(51) Int. Cl.[7] .................................................. B62D 1/10
(52) U.S. Cl. ...................... 74/552; 403/379.4; 403/374.3
(58) Field of Search .......................... 74/552; 280/728.2, 280/731; 403/379.4, 378, 374.3

(56) References Cited

U.S. PATENT DOCUMENTS

| | | |
|---|---|---|
| 3,047,318 | 7/1962 | Berkshire . |
| 5,344,252 | 9/1994 | Kakimoto . |
| 5,588,337 * | 12/1996 | Milton ..................................... 74/552 |
| 5,615,910 | 4/1997 | Margetak et al. . |
| 5,617,763 * | 4/1997 | Cymbal ................................. 74/552 |
| 5,685,559 | 11/1997 | Cuevas . |
| 5,921,147 * | 7/1999 | Nagata et al. .......................... 74/552 |
| 5,975,561 * | 11/1999 | Harvey et al. ..................... 280/728.2 |

FOREIGN PATENT DOCUMENTS

WO9509756    4/1995   (WO) .

OTHER PUBLICATIONS

Co-pending U.S. Patent Application Ser. No. 09/206,060, filed Dec. 4, 1998 entitled "Steering Shaft Attachment".

* cited by examiner

*Primary Examiner*—MaryAnn Green
(74) *Attorney, Agent, or Firm*—Tarolli, Sundheim, Covell, Tummino & Szabo L.L.P.

(57) ABSTRACT

An apparatus (10) includes a vehicle steering shaft (12), a mounting member (14), a locking pin (16), and a nut (120). The vehicle steering shaft (12) is rotatable about a longitudinal axis (22) to effect vehicle steering. The steering shaft (12) has a first locking pin passage (92) extending through the steering shaft (12) and transverse to the longitudinal axis (22). The first locking pin passage (92) is defined in part by first (94) and second (96) tapered surface portions. Each of the first (94) and second (96) surface portions tapers from a first circumference to a second, smaller circumference in a direction toward the longitudinal axis (22). The first (94) and second (96) tapered surface portions taper in opposite directions. The mounting member (14) is receivable on the steering shaft (12) and has a second locking pin passage (72). The locking pin (16) is long enough to extend through both the first (92) and second (72) locking pin passages for securing the mounting member (14) to the steering shaft (12). The locking pin (16) has a tapered portion (104) engagable with the first tapered surface portion (94) of the first locking pin passage (92) and a threaded portion (102). The nut (120) engages the threaded portion (102) of the locking pin (16) for securing the locking pin (16) in engagement with the steering shaft 12 and the mounting member (14) to lock the mounting member (14) and the steering shaft (12) together for joint rotation. The nut (120) has a tapered portion (122) engagable with the second tapered surface portion (96) of the first locking pin passage (92).

12 Claims, 2 Drawing Sheets

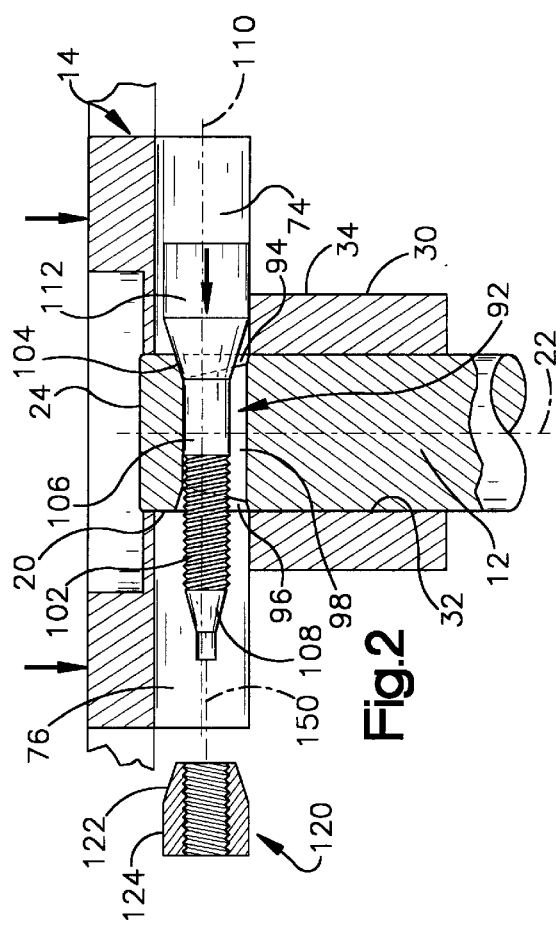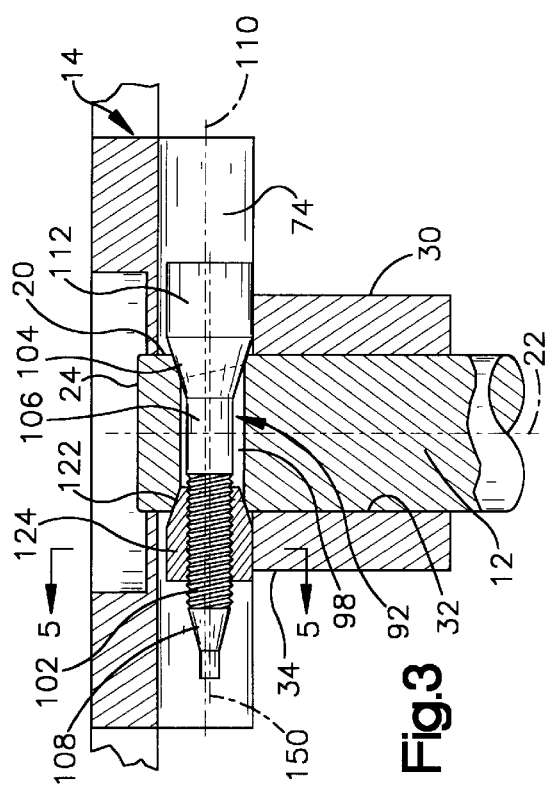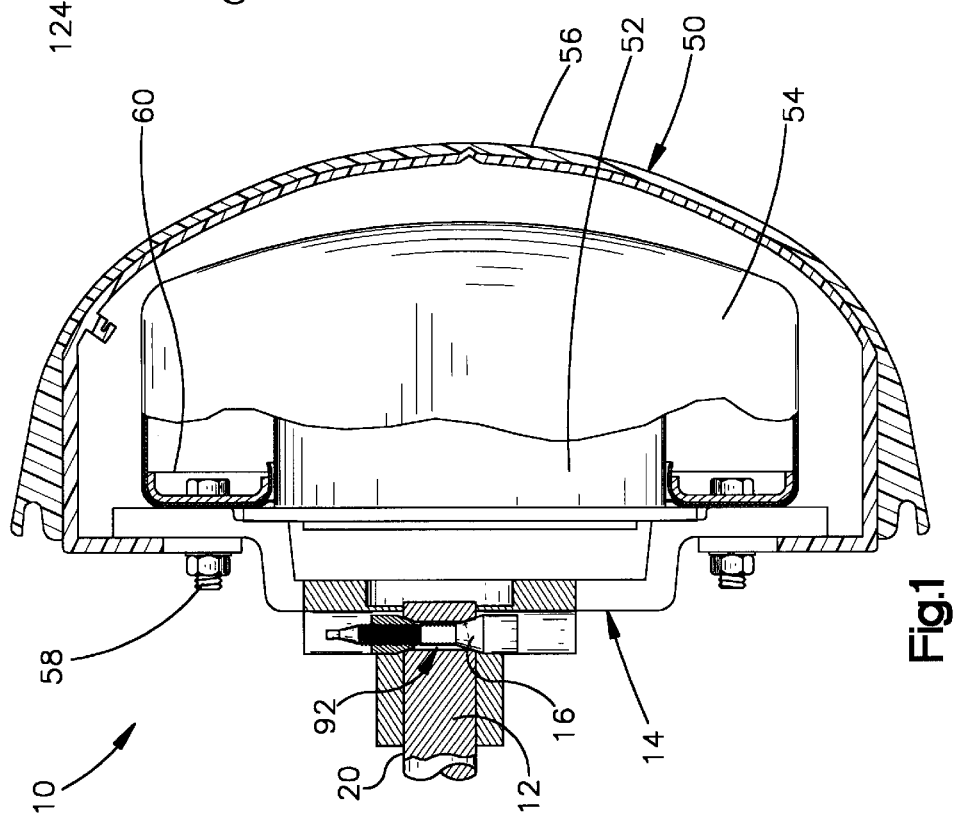

STEERING ATTACHMENT WITH TAPERED PIN AND FASTENER

FIELD OF THE INVENTION

The present invention relates to the attachment of a vehicle steering wheel and/or a vehicle occupant safety apparatus to the steering shaft of a vehicle.

BACKGROUND OF THE INVENTION

A conventional apparatus for supporting a steering wheel and a driver's side air bag module on a vehicle steering shaft includes a mounting member. The mounting member has a hub which receives an end portion of the steering shaft. A set screw is supported in a radially extending bore in the hub of the mounting member. The set screw engages the end portion of the steering shaft to hold the mounting member on the steering shaft.

SUMMARY OF THE INVENTION

In accordance with the present invention, an apparatus comprises a vehicle steering shaft, a mounting member, a locking pin, and a nut. The vehicle steering shaft is rotatable about a longitudinal axis to effect vehicle steering. The steering shaft has a first locking pin passage extending through the steering shaft and transverse to the longitudinal axis. The first locking pin passage is defined in part by first and second tapered surface portions. Each of the first and second tapered surface portions tapers from a first circumference to a second smaller circumference in a direction from an exterior surface of the steering shaft toward the longitudinal axis. The first and second tapered surface portions taper in opposite directions. The mounting member is receivable on the steering shaft and has a second locking pin passage. The locking pin is long enough to extend through both the first and second locking pin passages for securing the mounting member to the steering shaft. The locking pin has a tapered portion for engaging the first tapered surface portion of the first locking pin passage and a threaded portion. The nut engages the threaded portion of the locking pin for securing the locking pin in engagement with the steering shaft and the mounting member to lock the mounting member and the steering shaft together for joint rotation. The nut has a tapered portion engagable with the second tapered surface portion of the first locking pin passage.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a side view, partly in section, of an apparatus in accordance with the present invention, in an assembled condition;

FIG. 2 is an enlarged view of a portion of the apparatus of FIG. 1, in a partially assembled condition;

FIG. 3 is an enlarged view similar to FIG. 2 showing the parts in an assembled condition;

DESCRIPTION OF A PREFERRED EMBODIMENT

Figure 4:
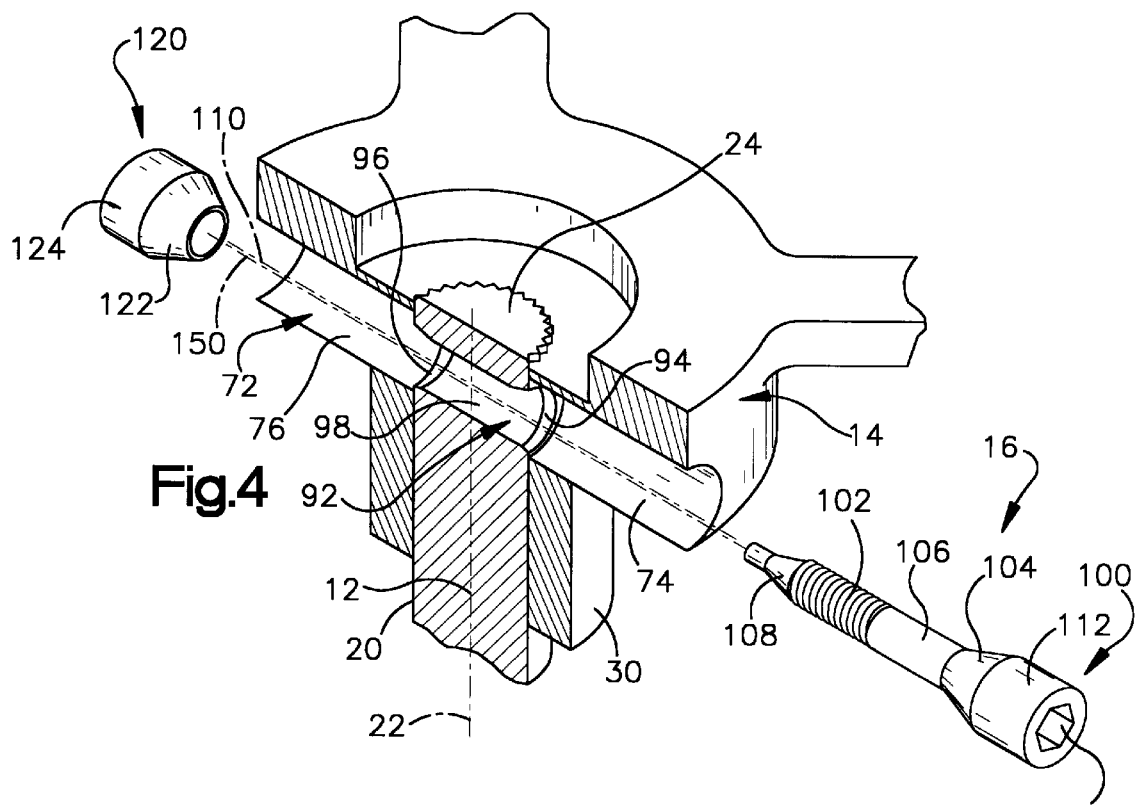
FIG. 4 is an exploded perspective view of the parts of FIG. 3.

The present invention relates to the attachment of a vehicle steering wheel and/or a vehicle safety apparatus to a steering shaft of a vehicle. As representative of the present invention, FIG. 1 illustrates an apparatus 10 including a vehicle steering shaft 12, a mounting member 14, and a locking pin 16.

The vehicle steering shaft 12 is a part of a steering column of a vehicle. The vehicle steering shaft 12 has a cylindrical outer side surface 20 centered on an axis 22 (FIG. 2). The vehicle steering shaft 12 also has a flat, radially extending end surface 24. The vehicle steering shaft 12 is supported for rotation about the axis 22.

The mounting member 14 includes a hub 30. The hub 30 has a cylindrical inner side surface 32 centered on the axis 22. The surface 32 defines a passage through the hub 30. The hub 30 also has an outer side surface 34. The inner side surface 32 of the hub 30 and the outer surface 20 of the vehicle steering shaft 12 may, if desired, be splined (FIG. 4) or tapered (not shown).

The mounting member 14 supports a vehicle occupant safety module 50 (FIG. 1). The module 50 includes an inflator 52 and an inflatable vehicle occupant protection device 54 such as an air bag. The inflator 52 provides inflation fluid to inflate the inflatable vehicle occupant protection device, and may contain an ignitable material for generating a volume of inflation fluid. The inflator 52 may alternatively contain a stored quantity of pressurized inflation fluid, or a combination of pressurized inflation fluid and ignitable material for heating the inflation fluid. The inflator 52 and the air bag 54 are enclosed in a cover 56.

A plurality of fasteners 58 and a retaining ring 60 secure the inflator 52, the air bag 54 and the cover 56 to the mounting member 14. The mounting member 14 also supports a vehicle steering wheel (not shown) through fasteners (not shown) connected with the mounting member.

The vehicle steering shaft 12 is rotatable about the axis 22 to effect vehicle steering. The vehicle steering shaft 12 has a first locking pin passage 92 extending through the vehicle steering shaft 12 and transverse to the axis 22. The first locking pin passage 92 is defined in part by first 94 and second 96 tapered surface portions. Each of the first 94 and second 96 tapered surface portions tapers from a first circumference to a second smaller circumference in a direction from an exterior surface of the steering shaft 12 toward the longitudinal axis 22, as shown in FIG. 2. The first 94 and second 96 tapered surface portions taper in opposite directions. A cylindrical, non-tapered surface portion 98 on the vehicle steering shaft 12 is intermediate the first 94 and second 96 tapered surface portions and has a longitudinal axis of symmetry 150.

Figure 6:
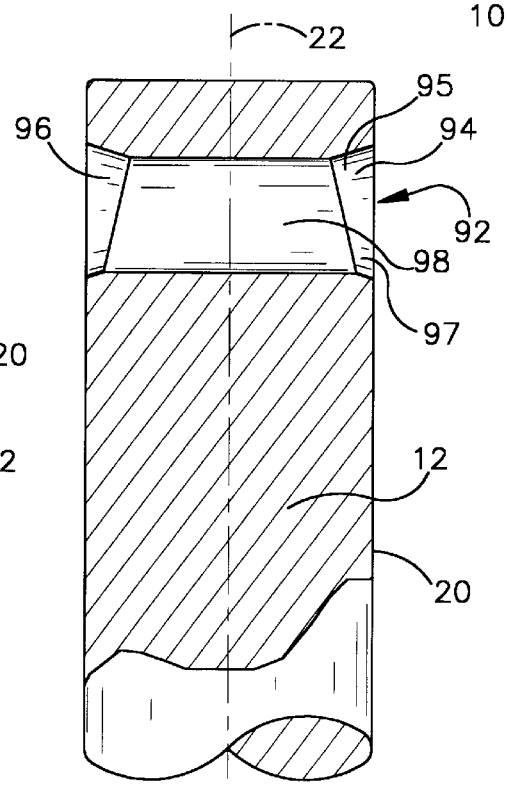
FIG. 6 is a sectional view of a part of the assembly of FIG. 3.

The first tapered surface portion 94 of the steering shaft 12 includes an upper arc portion 95 (FIG. 6) and a lower arc portion 97. The upper arc portion 95 extends inward toward the axis 22 of the steering shaft 12 a greater distance than the lower arc portion 97, as shown in FIG. 6. The second tapered surface portion 96 has a similar, but mirrored configuration.

The taper angle of the first tapered surface portion 94 is the same as the taper angle of a first tapered portion 104 of the locking pin 16. The taper angle of the second tapered surface portion 96 is the same as the taper angle of a second tapered portion 122 of a nut 120. The taper angle of the first tapered surface portion 94 is equal to the taper angle of the second tapered surface portion 96, as shown in FIG. 6.

The mounting member 30 is receivable on the vehicle steering shaft 12 and has a second locking pin passage 72. The second locking pin passage 72 includes a first portion 74 and a second portion 76. The first portion 74 of the passage 72 receives a head portion 100 of the locking pin 16. The second portion 76 of the passage 72 receives a shoulder portion 124 of the nut 120.

The locking pin 16 is long enough to extend through both the first 92 and second 72 locking pin passages to secure the mounting member 30 to the vehicle steering shaft 12. The first tapered portion 104 of the locking pin 16 engages the first tapered surface portion 94 of the first locking pin passage 92. The locking pin 16 includes a threaded portion 102 and an intermediate portion 106 that connects the threaded portion 102 to the first tapered portion 104. The intermediate portion 106 is located within the portion of the first locking pin passage 92 defined by the non-tapered surface portion 98 on the vehicle steering shaft 12. The intermediate portion 106 of the locking pin 16 defines a cylinder with a longitudinal axis 110 offset from the longitudinal axis of symmetry 150 of the non-tapered surface portion 98 (FIG. 3) when the apparatus 10 is fully assembled. The locking pin 16 also has a cylindrical head portion 112. A drive socket 105 is formed in the head portion 112.

The locking pin 16 has a second tapered portion 108 for facilitating insertion of the locking pin 16 through the first 92 and the second 72 locking pin passages.

Figure 5:
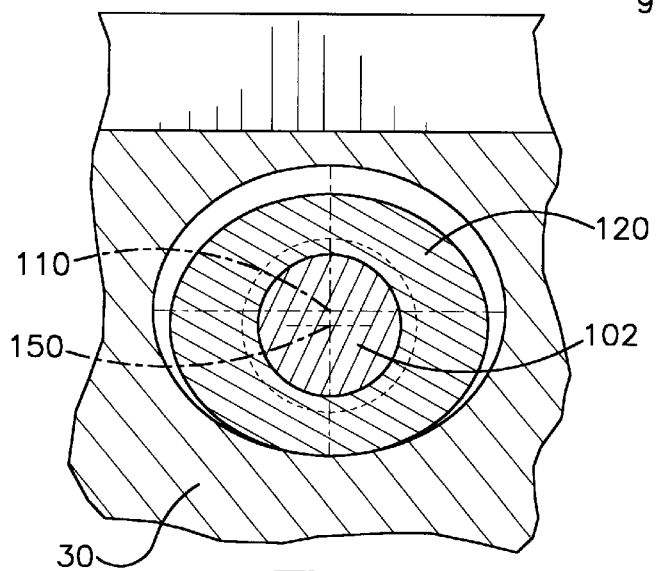
FIG. 5 is a sectional view taken along line 5—5 in FIG. 3.

The nut 120 screws on to and engages the threaded portion 102 of the locking pin 16 to secure the locking pin 16 in engagement with the vehicle steering shaft 12 and the mounting member 30 to lock the mounting member 30 and the steering shaft 12 together for joint rotation. The tapered portion 122 of the nut 120 engages the second tapered surface portion 96 of the first locking pin passage 92. The nut 120 has a noncircular outer circumference to prevent rotation of the nut 120 while the locking pin 16 is screwed into the nut 120, as shown in FIG. 5.

As the nut 120 and the locking pin 16 are screwed together, the tapered portion 104 of the locking pin 16 and the tapered portion 122 of the nut 120 force the mounting member 30 along the axis 22 into a final installed position, as shown in FIG. 3. Specifically, to fix the mounting member 14 to the steering shaft 12, the second locking pin passage 72 in the hub 30 is aligned circumferentially with the first tapered surface portion 94 of the first locking pin passage 92 in the vehicle steering shaft 12 by a suitable keying arrangement (not shown). The hub 30 is moved axially onto the steering shaft 12. The diameter of the inner surface 32 of the hub 30 and the diameter of the outer surface 20 of the vehicle steering shaft 12 are selected so that the hub 30 does not initially move into its final assembled position (FIG. 3) on the vehicle steering shaft 12. Instead the hub 30 stops at an intermediate position of assembly (FIG. 2). In this intermediate position of assembly, the second locking pin passage 72 is slightly offset axially from the first locking pin passage 92 in the steering shaft 12.

The locking pin 16 is then moved into the first portion 74 of the second locking pin passage 72 in the hub 30. The tapered portion 104 of the locking pin 16 passes completely through the first portion 74 and partially engages the first tapered surface portion 94 of the steering shaft 12. The threaded portion 102 of the locking pin 16 is screwed into the nut 120. The head portion 112 of the locking pin 16 is received and retained in the first portion 74 of the second locking pin passage 72.

As the locking pin 16 is screwed into the nut 120, the tapered portion 104 of the locking pin 16 engages the first tapered surface portion 94 of the vehicle steering shaft 12. The tapered portion 122 of the nut 120 engages the second tapered surface portion 96 of the vehicle steering shaft 12. This engagement between the locking pin 16, the nut 120, and the steering shaft 12 is two point contact only (FIG. 2) because of the initial axial offset between the hub 30 and the vehicle steering shaft 12. Movement of the locking pin 16 into the first locking pin passage 92 results in an axially directed force being applied by the locking pin 16 and the nut 120 against the vehicle steering shaft 12 and the mounting member 14. Because the vehicle steering shaft 12 is fixed axially in the vehicle, this force causes the hub 30, and the mounting member 14 as a whole, to move in a downward direction as viewed in FIG. 2, farther onto the steering shaft 12.

As the locking pin 16 is screwed farther into the nut 120, the mounting member 14 eventually moves to a position as shown in FIG. 3 in which the first locking pin passage 92 is aligned axially with the second locking pin passage 72 in the mounting member 14. The tapered portion 104 of the locking pin 16 seats tightly against the first tapered surface portion 94 and the tapered portion 122 of the nut 120 seats tightly against the second tapered surface portion 96. The engagement of the locking pin 16 and the nut 120 in the vehicle steering shaft 12 locks the mounting member 14 to the vehicle steering shaft 12. The mounting member 14 can not move axially or rotationally relative to the vehicle steering shaft 12.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus comprising:

a vehicle steering shaft rotatable about a longitudinal axis to effect vehicle steering, said steering shaft having a first locking pin passage extending through said steering shaft and transverse to said longitudinal axis, said first locking pin passage being defined in part by first and second tapered surface portions, each of said first and second tapered surface portions tapering from a first circumference to a second smaller circumference in a direction from an exterior surface of said steering shaft toward said longitudinal axis, said first and second tapered surface portions tapering in opposite directions;

a mounting member receivable on said steering shaft, said mounting member having a second locking pin passage;

a locking pin that is long enough to extend through both said first and second locking pin passages for securing said mounting member to said steering shaft, said locking pin having a tapered portion engagable with said first tapered surface portion of said first locking pin passage and a threaded portion; and a threaded nut engagable with said threaded portion of said locking pin for securing said locking pin in engagement with said steering shaft and said mounting member to lock said mounting member and said steering shaft together for joint rotation, said nut having a tapered portion engagable with said second tapered surface portion of said first locking pin passage.

2. The apparatus as defined in claim 1 wherein said second locking pin passage of said mounting member includes a first portion and a second portion, said first portion of said second locking pin passage receiving a head portion of said locking pin and said second portion of said second locking pin passage receiving a shoulder portion of said nut.

3. The apparatus as defined in claim 2 wherein said first locking pin passage is further defined by a cylindrical non-tapered surface portion of said steering shaft intermediate said first and second tapered surface portions of said steering shaft and having a longitudinal axis of symmetry.

4. The apparatus as defined in claim 3 wherein said locking pin includes an intermediate portion connecting said threaded portion of said locking pin to said tapered portion of said locking pin, said intermediate portion of said locking pin being locatable within a portion of said second locking pin passage defined by said non-tapered surface portion, said intermediate portion of said locking pin being shaped as a cylinder with a longitudinal axis offset from said longitudinal axis of symmetry of said non-tapered surface portion of said steering shaft.

5. The apparatus as defined in claim 1 wherein said first tapered surface portion of said steering shaft includes an upper arc portion and a lower arc portion, said upper arc portion extending inward toward said longitudinal axis of said steering shaft a greater distance than said lower arc portion.

6. The apparatus as defined in claim 1 further including a vehicle occupant safety apparatus connected with said mounting member and supported on said steering shaft by said mounting member for rotation with said steering shaft.

7. The apparatus as defined in claim 1 wherein said locking pin has a second tapered portion for facilitating insertion of said locking pin through said first and second locking pin passages.

8. The apparatus as defined in claim 1 wherein the taper angle of said first tapered surface portion is the same as the taper angle of said tapered portion of said locking pin.

9. The apparatus as defined in claim 1 wherein the taper angle of said second tapered surface portion is the same as the taper angle of said tapered portion of said nut.

10. The apparatus as defined in claim 1 wherein the taper angle of said first tapered surface portion is equal to the taper angle of said second tapered surface portion.

11. The apparatus as defined in claim 1 wherein said nut has a non-circular outer circumference to prevent rotation of said nut while said locking pin is being screwed into said nut.

12. The apparatus as defined in claim 1 wherein said tapered portion of said locking pin and said tapered portion of said nut force said mounting member along said longitudinal axis into a final installed position by engaging said first and second tapered surface portions of said first locking pin passage and applying force to said mounting member in a direction along said longitudinal axis as said locking pin and said nut are screwed together.

\* \* \* \* \*